US005308681A

United States Patent [19]

Taki et al.

[11] Patent Number: 5,308,681

[45] Date of Patent: May 3, 1994

[54] THERMAL TRANSFER RECORDING SHEET

[75] Inventors: Tsutomu Taki, Tokyo; Katsuhiko Kuroda, Yokohama, both of Japan

[73] Assignee: Mitsubishi Kasei Corporation, Tokyo, Japan

[21] Appl. No.: 911,511

[22] Filed: Jul. 10, 1992

[30] Foreign Application Priority Data

Jul. 10, 1991 [JP] Japan ................................ 3-170197

[51] Int. Cl.⁵ ................................................ B32B 9/00

[52] U.S. Cl. .................................... 438/195; 428/446; 428/451; 428/913; 428/914

[58] Field of Search ............... 428/195, 328, 331, 484, 428/488.1, 488.4, 913, 914, 405

[56] References Cited

U.S. PATENT DOCUMENTS

| | | | |
|---|---|---|---|
| 4,555,427 | 11/1985 | Kawasaki et al. | 428/195 |
| 4,925,735 | 5/1990 | Koshizuka et al. | 428/423.1 |
| 4,927,666 | 5/1990 | Kawasaki et al. | 428/195 |
| 4,931,123 | 6/1990 | Makishima | 428/484 |
| 4,961,997 | 10/1990 | Asano et al. . | |
| 5,106,676 | 4/1992 | Sato et al. | 428/212 |
| 5,202,176 | 4/1993 | Higuchi et al. | 428/195 |

FOREIGN PATENT DOCUMENTS

| | | | |
|---|---|---|---|
| 0303729 | 2/1989 | European Pat. Off. . | |
| 62-33682 | 2/1987 | Japan | 428/195 |

OTHER PUBLICATIONS

Patent Abstracts of Japan, vol. 11, No. 218, (M-607)[2665], Jul. 15, 1987, & JP-A-62-33682, Feb. 13, 1987, T. Kubo, et al., "Thermal Transfer Sheet".

Patent Abstracts of Japan, vol. 12, No. 484, (M-776)[3331], Dec. 16, 1988, & JP-A-63-203386, Aug. 23, 1988, T. Tanaka, et al., "Thermal Transfer Material".

*Primary Examiner*—Patrick J. Ryan
*Assistant Examiner*—William A. Krynski
*Attorney, Agent, or Firm*—Oblon, Spivak, McClelland, Maier & Neustadt

[57] ABSTRACT

A thermal transfer recording sheet comprising a base film, a heat transferable ink layer formed on one side of the base film and a heat resistant lubricating layer formed on the other side of the base film, wherein the heat resistant lubricating layer is formed by coating on the base film a coating solution containing at least a binder resin and at least two mutually reactive modified silicone oils, and then reacting the mutually reactive modified silicone oils.

9 Claims, No Drawings

THERMAL TRANSFER RECORDING SHEET

The present invention relates to a thermal transfer recording sheet. Particularly, it relates to a thermal transfer recording sheet which is advantageously useful for color recording of television images or for color recording by terminals of office equipments such as facsimile machines, printers or copying machines.

In the thermal transfer recording system, an image-receiving sheet is overlaid on the ink-coated side of a thermal transfer recording sheet having a colorant-containing ink coated thereon, and recording is conducted by heating the rear side of the thermal transfer recording sheet by a thermal head so that the colorant in the thermal transfer recording sheet is thereby transferred to the image-receiving sheet. Such a system includes a wax transfer recording system using a heat-meltable ink and a dye transfer recording system using a sublimable dye-containing ink.

In a thermal transfer recording system of this type, the thermal transfer recording sheet is heated to a high temperature by a thermal head. If the heat resistance of the base film of the thermal transfer recording sheet is inadequate, the base film is likely to fuse and stick to the thermal head. By such fusion, running of the thermal head will be inferior, and sticking, or wrinkling or rupture of the sheet is likely to occur, whereby proper recording will no longer be possible. Therefore, it has been proposed to provide protective films of various heat resistant resins in order to improve the heat resistance of the base film (Japanese Unexamined Patent Publications No. 7467/1980 and No. 74195/1982), or to add heat resistant fine particles, lubricants or surfactants to such protective layers in order to further improve the running properties (Japanese Unexamined Patent Publications No. 146790/1980, No. 155794/1981 and No. 9789/1982).

Further, it is known that various releasing agents may be incorporated in an image-receiving layer of an image-receiving sheet, which receives a colorant and which is different in the construction and the effects from the heat resistant lubricating layer (U.S. Pat. Nos. 4,626,256 and 4,820,687).

As the lubricating agent incorporated to improve such running properties, it is common to employ a liquid product. However, if it has poor compatibility with the heat resistant resin used in combination, the resin and the lubricating agent tend to be separated, and it becomes difficult to form a uniform heat resistant lubricating layer, whereby no adequate running properties will be obtained.

Especially when the heat transfer recording sheet is stored for a long period of time, the lubricating agent gradually undergoes phase separation and no adequate running properties will be obtained, even if the running properties at the initial stage are satisfactory.

Japanese Unexamined Patent Publication No. 27380/1989 discloses a method wherein a silicone oil or a silicone surfactant is modified by self-reaction by crosslinking or polymerization mainly by plasma treatment. However, such a method requires a special apparatus for plasma treatment after the coating step, and the reactivity is rather low and no adequate effects are obtainable.

On the other hand, Japanese Unexamined Patent Publication No. 145395/1990 discloses a method of using a mixture system comprising a reactive resin and a polyisocyanate and a reactive polysiloxane compound. However, the reactivity between the reactive resin and the siloxane compound is rather low, and a uniform reaction mixture can not be obtained, whereby no adequate effects can be obtained.

The present inventors have conducted extensive studies for improving the compatibility of the heat resistant resin and the lubricating agent in the thermal transfer recording sheet, and as a result, have found it possible to obtain a thermal transfer recording sheet having excellent running properties by using a certain specific lubricating agent for a heat resistant resin. The present invention has been accomplished on the basis of this discovery.

That is, such an object of the present invention can be accomplished by providing a thermal transfer recording sheet comprising a base film, a heat transferable ink layer formed on one side of the base film and a heat resistant lubricating layer formed on the other side of the base film, wherein the heat resistant lubricating layer is formed by coating on the base film a coating solution containing at least a binder resin and at least two mutually reactive modified silicone oils, and then reacting the mutually reactive modified silicone oils.

Now, the present invention will be described in detail with reference to the preferred embodiments.

In the present invention, the modified silicone oils are preferably those represented by the following formula (I):

(I)

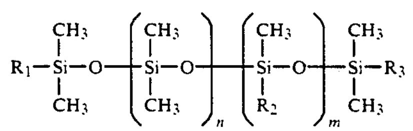

wherein at least one of $R_1$, $R_2$ and $R_3$ is an organic group containing an epoxy group, a carboxyl group, an amino group or a hydroxyl group, the rest being a methyl group or a phenyl group, n is an integer of at least 1, and m is an integer of at least 0.

Such modified silicone oils can be prepared by a usual method (such as a method described in detail at pages 163 et seq of "Silicone Handbook", compiled by Kunio Ito, Nikkan Kogyo Shinbun). As the main material, tetramethyltetraphenylcyclotetrasiloxane or octaphenylcyclotetrasiloxane is preferred. The modified silicone oils are produced by a reaction of such main material with a silicon compound having various modifying groups (such as an amino group, an epoxy group, a carboxy group and a hydroxy group).

To use in the heat resistant lubricating layer of the present invention, the modified silicone oils should be selected to have a combination- of at least two mutually reactive modified silicone oils which are mutually reactive for bonding. For example, they may be one of the following specific combinations:

(1) an amino-modified silicone oil and an epoxy-modified silicone oil, (2) an amino-modified silicone oil and a carboxy-modified silicone oil, (3) a hydroxy-modified silicone oil and an epoxy-modified silicone oil, (4) a hydroxy-modified silicone oil and a carboxy-modified silicone oil, and (5) an epoxy-modified silicone oil and a carboxy-modified silicone oil.

Among them, a combination using an amino-modified silicone oil is preferred, since the reactivity is thereby excellent. Further, a combination using an epoxy modified silicone oil is preferred, since the stability after the reaction is thereby excellent.

When three or more modified-silicone oils are to be used, all of them may not mutually react, so long as each of them is able to react with at least one of the rest.

The blend ratio of the modified silicone oils in the above combinations, is preferably such that the contents of the respective modifying groups are equal to each other. However, the molar ratio of the respective modifying groups is usually within a range of from 1/10 to 10/1.

To form the heat resistant lubricating layer of the present invention, the above-mentioned mutually reactive modified silicone oils and the binder resin and other components, which will be described hereinafter, are mixed to obtain a coating solution, which is then coated, and an optional heat treatment, such as heating and drying treatment. is applied during or after the coating for the reaction of the mutually reactive modified silicone oils in the coating composition.

As the binder resin for the heat resistant lubricating layer, it is common to employ the one having high heat resistance. For example, it may be a cellulose-type resin such as ethyl cellulose, hydroxyethyl cellulose or cellulose acetate, a vinyl-type resin such as polyvinyl alcohol, polyvinyl acetate or polyvinyl butyral, a radiation-curable resin such as polyester acrylate, epoxy acrylate or polyol acrylate, a phenoxy resin or a polycarbonate resin. Among them, a radiation curable resin, particularly epoxy acrylate, is preferred. In order to obtain good compatibility with the lubricating agent in the present invention, the resin preferably has a solubility parameter within a range of from 8 to 12, more preferably from 9 to 11.

The total amount of the modified silicone oils to the binder resin is usually from 0.1 to 10% by weight to the resin. If the total amount is less than this range, no adequate running properties tend to be obtained. On the other hand, if it is too much, excess silicone oils are likely to contaminate the ink layer surface, and the storage stability will be adversely affected.

For the purpose of improving the running properties, fine particles of a phosphate, silica, alumina, titanium oxide or the like may be incorporated, in addition to the above-mentioned modified silicone oils and the binder resin, at the time of forming the heat resistant lubricating layer.

Various methods such as those employing a gravure coater, a reverse coater and an air doctor coater, as disclosed in e.g. "Coating Systems", editted by Yuji Harasaki and published by Maki Shoten (1979), may be employed for applying the above coating solution to form the heat resistant lubricating layer.

The thickness of the heat resistant lubricating layer to be formed on the base film, is usually from 0.1 to 10 μm, preferably from 0.3 to 5 μm.

The base film in the heat transfer sheet of the present invention may be a polyethylene terephthalate film, a polyamide film, a polyaramide film, a polyimide film, a polycarbonate film, a polyphenylene sulfide film, a polysulfone film, a cellophane film, a triacetate film or a polypropylene film. Among them, a polyethylene terephthalate film is preferred from the viewpoint of the mechanical strength, the dimensional stability, the heat resistance and the price. A biaxially stretched polyethylene terephthalate film is more preferred. The thickness of such a base film is preferably from 1 to 30 μm, more preferably from 2 to 10 μm.

The ink layer of the thermal transfer recording sheet of the present invention may be formed by a usual method. For example, in the case of the sublimation type thermal transfer recording sheet, a sublimable or heat diffusible dye and a heat resistant binder resin may be dissolved or dispersed in a suitable solvent to obtain an ink, and this ink is coated on the base film, followed by drying. In the case of the melting thermal transfer recording sheet, a coloring matter such as a pigment or a dye is dissolved or dispersed in a heat-meltable substance, if necessary, by means of a solvent, to obtain an ink, and this ink is coated on the base film, followed by drying.

As the sublimable or heat diffusible dye to be used for the above sublimation type thermal transfer recording sheet, non-ionic dyes such as azo dyes, anthraquinone dyes, nitro dyes, styryl dyes, naphthoquinone dyes, quinophthalone dyes, azomethine dyes, cumalin dyes or condensed polycyclic dyes may be mentioned. As the binder resin, a polycarbonate resin, a polysulfone resin, a polyvinylbutyral resin, a phenoxy resin, a polyarylate resin, a polyamide resin, a polyaramide resin, a polyimide resin, a polyetherimide resin, a polyester resin, an acrylonitrile-styrene resin as well as cellulose resins such as acetyl cellulose, methyl cellulose and ethyl cellulose, may, for example, be mentioned. As the solvent, an organic solvent such as toluene or xylene, a ketone solvent such as methyl ethyl ketone, methyl isobutyl ketone or cyclohexanone, an ester solvent such as ethyl acetate or butyl acetate, an alcohol solvent such as isopropanol, butanol or methyl cellosolve, an ether solvent such as dioxane or tetrahydrofuran, or an amide solvent such as dimethylformamide or N-methylpyrrolidone, may be employed.

As the colorant to be used for the melting type thermal transfer recording sheet, the pigment includes, for example, an inorganic pigment such as carbon black, and various organic pigments of azo type or condensed polycyclic type, and the dye includes, for example, acidic, basic dyes, metal complex dyes and oil soluble dyes. Further, as the heat-meltable substance, a solid or semi-solid substance having a melting point of from 40° to 120° C. is preferred, such as paraffin wax, microcrystalline wax, carnauba wax, montan wax, Japan wax or fat-type synthetic wax. As the solvent, those mentioned above with respect to the sublimation type thermal transfer recording sheet, may be employed.

To the above described various inks, in addition to the above described components, various additives such as organic or inorganic non-sublimable fine particles, dispersants, antistatic agents, blocking-preventing agents, defoaming agents, antioxidants and viscosity controlling agents, may be incorporated, as the case requires.

Coating of such an ink may be conducted by the same methods as described above with respect to the coating of the heat resistant lubricating layer. The thickness of the coated film is preferably from 0.1 to 5 μm as the dried film thickness.

Further, in the production of the recording sheet of the present invention, corona treatment may be applied to the surface of the base film in order to improve the adhesion of the base film and the layers formed thereon as described above, or primer coating treatment may be conducted by means of a resin such as a polyester resin, a cellulose resin, a polyvinyl alcohol, a urethane resin or a polyvinylidene chloride.

The thermal transfer recording sheet of the present invention provides good compatibility between the heat resistant resin and the lubricating agent in the heat resistant lubricating layer, and thus it is durable during the storage for a long period of time and provides excellent running properties.

Now, the present invention will be described in further detail with reference to Examples. However, it should be understood that the present invention is by no means restricted by such specific Examples. In these Examples, "parts" means "parts by weight".

EXAMPLES

(a) Preparation of a Thermal Transfer Recording Sheet

Using a biaxially stretched polyethylene terephthalate film (thickness: 4.5 μm) as a base film, a coating solution having the composition as shown in the following Table 1 was coated in a wet film thickness of about 12 μm on one side of the film, then dried and treated by a high pressure mercury lamp with an energy of 120 $W/cm^2$ with a distance between the mercury lamp and the film being 115 mm under an irradiation energy of 120 $mJ/cm^2$ for a curing reaction to form a heat resistant lubricating layer.

TABLE 1

| Name of compounds | Tradenames | Parts |
|---|---|---|
| Dipentaerythritol hexaacrylate type compound | KAYARAD DPHA, manufactured by Nippon Kayaku K.K. | 1.2 |
| Epoxy acrylate type compound | RIPOXY SP-1509, manufactured by Showa Kobunshi K.K. | 2.8 |
| Modified silicone oils | See Table 2 | 0.1 |
| Polymerization initiator | Darocur 1173, manufactured by Merck Co. | 0.2 |
| Ethyl acetate | | 30 |
| Isopropyl alcohol | | 15 |

On the back side of the heat resistant lubricating layer of the above film, an ink comprising 5 parts of a sublimable dye (C.I. Solvent Blue 95), 10 parts of a polysulfone resin and 85 parts of chlorobenzene, was coated and dried to form an ink layer having a thickness of about 1 μm, to obtain a thermal transfer recording sheet.

(b) Preparation of an Image-Receiving Sheet

A liquid comprising 10 parts of a saturated polyester resin ("TR-220", tradename, manufactured by Nippon Gosei K.K.), 0.5 part of an amino-modified silicone ("KF-393", tradename, manufactured by Shin-Etsu Kagaku Kogyo K.K.), 15 parts of methyl ethyl ketone and 15 parts of xylene, was coated on a synthetic paper ("YUPO FPG 150", tradename, manufactured by Oji Yuka K.K.) by a wire bar, then dried (dried film thickness: about 5 μm) and further subjected to heat treatment in an oven at 100° C. for 30 minutes to obtain an image-receiving sheet.

(c) Results of the Transfer Recording

The recording sheet and the image-receiving sheet prepared as described above, were put together so that the ink layer of the recording sheet was in contact with the resin-coated side of the image-receiving sheet, and an electric power of 0.4 W/dot was applied to the heat resistant layer side of the recording sheet for 10 msec by a partially glazed line thermal head having a heat generating resistor density of 8 dot/mm to conduct transfer recording of 200 mm at a density of 8 lines/mm.

The results are shown in Table 2.

(d) Results of Evaluation of the Storage Stability

The recording sheet was wound on a paper tube of 1 inch and held for 2 weeks in an environment at a temperature of 60° C. under a relative humidity of 60%. Then, transfer recording was conducted under the same conditions as in (c) to evaluate the running properties.

The results are shown in Table 2.

TABLE 2

| | Modified silicone oils | | | | | | | | |
|---|---|---|---|---|---|---|---|---|---|
| | Modifying group | Modified degree* | Product No. | Manufacturers | Modifying group | Modified degree* | Product No. | Manufacturers | Blend weight ratio of A/B |
| Example 1 | Amino group | 1500 | 490 G | Toray | Epoxy group | 350 | X-22-343 | Shinetsu | 4/1 |
| Example 2 | Amino group | 1500 | 490 G | Toray | Epoxy group | 350 | X-22-343 | Shinetsu | 1/1 |
| Example 3 | Amino group | 840 | X-22-161A | Shinetsu | Epoxy group | 350 | X-22-343 | Shinetsu | 2/1 |
| Example 4 | Amino group | 840 | X-22-161A | Shinetsu | Carboxy group | 1250 | X-22-3710 | Shinetsu | 1/1 |
| Example 5 | Hydroxyl group | 750 | KF-851 | Shinetsu | Epoxy group | 350 | X-22-343 | Shinetsu | 2/1 |
| Comparative Example 1 | Amino group | 1500 | 490 G | Toray | — | — | — | — | 1/0 |
| Comparative Example 2 | Epoxy group | 350 | X-22-343 | Shinetsu | — | — | — | — | 1/0 |
| Comparative Example 3 | Hydroxyl group | 750 | KF-851 | Shinetsu | — | — | — | — | 1/0 |
| Comparative Example 4 | Amino group | 1500 | 490 G | Toray | Hydroxyl group | 750 | KF-851 | Shinetsu | 2/1 |

| | Results of transfer recording | | Results of storage stability | |
|---|---|---|---|---|
| | Running properties | Wrinkles | Running properties | Wrinkles |
| Example 1 | Good | Nil | Good | Nil |
| Example 2 | Good | Nil | Good | Nil |

TABLE 2-continued

| | | | | |
|---|---|---|---|---|
| Example 3 | Good | Nil | Good | Nil |
| Example 4 | Good | Nil | Good | Nil |
| Example 5 | Good | Nil | Good | Nil |
| Comparative Example 1 | Good | Nil | Sticking | Formed |
| Comparative Example 2 | Sticking | Nil | Sticking | Formed |
| Comparative Example 3 | Sticking | Formed | Sticking | Formed |
| Comparative Example 4 | Good | Nil | Sticking | Formed |

*Modified degree = modified silicone oil (g)/modifying group (mol).

We claim:

1. A thermal transfer recording sheet comprising a base film, a heat transferable ink layer formed on one side of the base film and a heat resistant lubricating layer formed on the other side of the base film, wherein the heat resistant lubricating layer is formed by coating on the base film a coating solution containing at least a binder resin and at least two mutually reactive modified silicone oils, which react and form chemical bonds with each other, and then reacting said silicone oils.

2. The thermal transfer recording sheet according to claim 1, wherein the mutually reactive modified silicone oils are at least two silicone oils of the following formula (I):

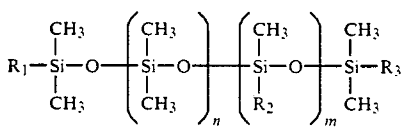

(I)

wherein at least one of $R_1$, $R_2$ and $R_3$ is an organic group containing an epoxy group, a carboxyl group, an amino group or a hydroxyl group, the rest being a methyl group or a phenyl group, n is an integer of at least 1, and m is an integer of at least 0.

3. The thermal transfer recording sheet according to claim 1, wherein the mutually reactive modified silicone oils are one of the following combinations:

(1) an amino-modified silicone oil and an epoxy-modified silicone oil, (2) an amino-modified silicone oil and a carboxy-modified silicone oil, (3) a hydroxy-modified silicone oil and an epoxy-modified silicone oil, (4) a hydroxy modified silicone oil and a carboxy-modified silicone oil, and (5) an epoxy-modified silicone oil and a carboxy-modified silicone oil.

4. The thermal transfer recording sheet according to claim 1, wherein one of the mutually reactive modified silicone oils is an amino-modified silicone oil or an epoxy-modified silicone oil.

5. The thermal transfer recording sheet according to claim 1, wherein the mutually reactive modified silicone oils are mixed in such a ratio that the molar ratio of the respective modifying groups is from 1:10 to 10:1.

6. The thermal transfer recording sheet according to claim 1, wherein the total amount of the mutually reactive modified silicone oils in the heat resistant lubricating layer is from 0.1 to 10% by weight to the binder resin.

7. The thermal transfer recording sheet according to claim 1, wherein the heat resistant lubricating layer has a thickness of from 0.1 to 10 μm.

8. The thermal transfer recording sheet according to claim 1, wherein the binder resin has a solubility parameter of from 8 to 12.

9. The thermal recording sheet according to claim 1, wherein the heat resistant lubricating layer is formed by coating on the base film a coating solution containing a binder resin and at least two mutually reactive modified silicone oils, and reacting the mutually reactive modified silicone oils by applying heat treatment at the same time as or after the coating.

* * * * *